May 21, 1946.    J. L. HARRIS    2,400,561
FLOAT VALVE
Filed April 26, 1943    2 Sheets-Sheet 1

INVENTOR.
JOHN L. HARRIS
BY Tate and Harris
ATTORNEYS

Patented May 21, 1946

2,400,561

UNITED STATES PATENT OFFICE 2,400,561

FLOAT VALVE

John L. Harris, Whitefish Bay, Wis., assignor to Perfex Corporation, Milwaukee, Wis., a corporation of Wisconsin Application April 26, 1943, Serial No. 484,568

12 Claims. (Cl. 137—68)

This invention relates generally to liquid level controls and more particularly to controls for supplying liquid fuel to vaporization type oil burners. In this type of apparatus a float is employed for controlling an inlet valve to a float chamber so as to maintain a constant level, this maintaining a constant head on a metering valve which meters the flow of oil to the burner. In order to meet existing safety requirements in the trade, it is necessary that provision be made for positively closing the inlet valve in case it should leak and permit the oil level in the float chamber to rise a predetermined amount above the normal constant level. It is also necessary to provide against float failure, that is, to cause closure of the inlet valve in case the float should leak and sink. In the past, the incorporating of the above safety features has required either additional expensive and delicate shut-off mechanism or resort to a double-seated inlet valve which involves considerable difficulties in manufacture.

The primary object of this invention is to provide a simple and dependable float valve embodying the required safety features.

This result is obtained by the use of a single open type float which gradually positions a single inlet valve so as to maintain a constant level. In case the inlet valve should leak, the level rises to a point where liquid flows into the float, causing it to sink and open the valve wide for flushing the same. This sinking movement of the float is transmitted through a motion reversing arrangement to the valve for forcing it closed with a greater force than provided by the float during normal operation.

Other objects of the invention will appear from the following description and appended claims.

For a full disclosure of the invention reference is made to the following detailed description and to the accompanying drawings, in which Fig. 1 is an elevation in section of one form of the invention;

Figure 1:
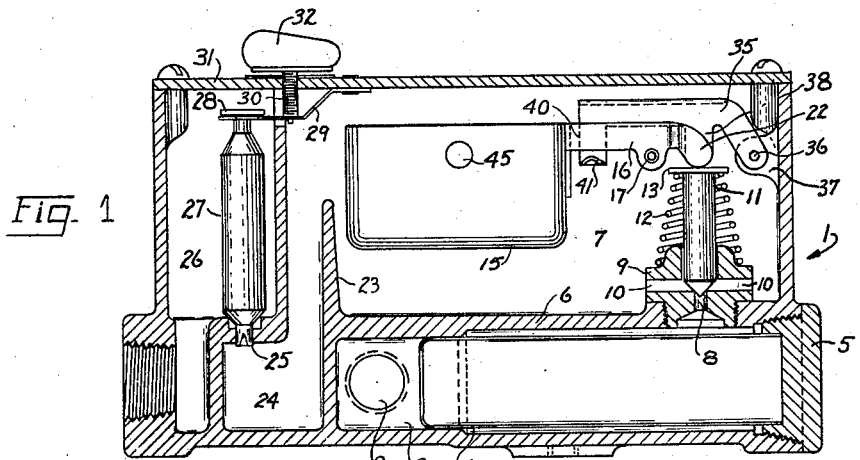

Referring to Fig. 1, reference character 1 indicates generally a valve casing having an inlet 2 opening into a filter chamber 3 which contains a filter element 4 of usual construction. This element is held in place at its right hand end by a plug 5 which closes the end of the filter chamber and which provides for removal of the filter. A partition 6 separates the filter chamber from the float chamber 7. This chamber is provided with an inlet valve including a valve port 8 formed in a fitting 9 which is screw-threaded into the partition 6. This inlet valve fitting is provided with transverse openings 10 and serves to guide an inlet valve member 11 which cooperates with a valve seat formed at the end of the valve port 8. A spring 12 surrounds the valve member 11 and bears against a plate 13 on the valve member, this serving to bias the valve member toward open position.

Figure 2:
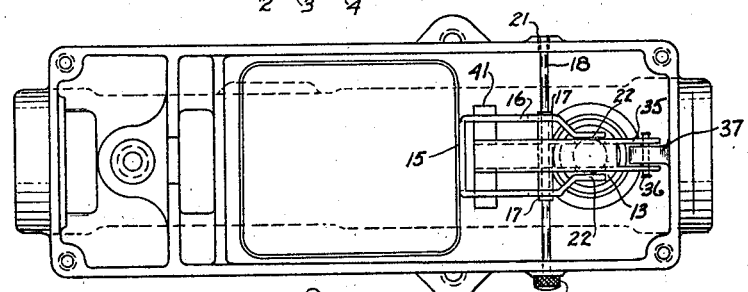
Fig. 2 is a top view of the float valve shown in Fig. 1.

The valve member 11 is positioned by lever means actuated by a float 15. This float is preferably formed as an open cup and is attached to a U-shaped lever 16 (Fig. 2). This float lever 16 is formed with pivot openings 17 in each of its legs for receiving a pivot pin 18. This pivot pin extends from side to side of the float chamber and is preferably provided with a knurled head 20 at one end and with screw threads 21 at its other end, this providing for ready removal and replacement of the pin. Each leg of the lever 16 is formed with an abutment portion 22 which engages the plate 13 on the valve member 11. It will be apparent that as the float 15 rises, the lever 16 rocks clockwise, thereby urging the valve member 11 against the valve seat. The float 15 therefore serves to maintain a substantially constant liquid level in the float chamber.

The liquid in leaving the float chamber flows across a dam 23 into a sump 24 from which it flows through a metering valve port 25 into an outlet chamber 26 from which it flows through a suitable oil line into the burner. The metering valve port is controlled by a metering valve member 27 having a head 28 engaged by a spring 29. This spring is biased in a direction to raise the valve member 27 and is controlled by means of a screw 30 which extends through the cover plate 31 and which is manually adjustable by a handle 32. Rotation of the handle 32 serves to raise or lower the metering valve member 27 and thus varies the amount of oil supplied to the burner.

In float valves of the character described, it is necessary to make provision against leakage of the inlet valve. If no protection were provided and the inlet valve should fail to hold, the float chamber would overflow, thereby allowing oil to flow on the floor around the heater to which the float valve is attached. Also it is necessary to make provision against float failure. Obviously a leaking float would cause the inlet valve to open, regardless of level, and thereby permit flooding of the device. In order to provide protection against valve leakage or float failure, the float actuated lever means includes a safety shut-off lever 35 above the valve member 11. The right hand end of this lever is pivoted at 36 to a boss 37 formed on the side wall of the casing. This safety shut-off lever 35 includes a downwardly extending abutment member 38 which engages the plate 13 between the abutment portions 22 of lever 16. The lever 35 also includes a downwardly extending portion 40 which extends between the legs of the float lever 16 and carries a cross-piece 41 which is adapted to be engaged by the legs of the float lever.

When the oil level is at the normal value, the parts assume the positions shown in which there is a slight space between the cross-piece 41 and the float lever 16, as shown in Fig. 1. At this time the float 15 positions the valve member 11 so as to balance the flow of oil through the inlet 8 with the flow of oil being permitted by the outlet metering valve 27. During this normal operation the safety shut-off lever 35 merely rides on the valve member 11 and has no effect whatever.

If dirt should lodge between the valve seat and valve member thereby preventing the inlet valve from seating properly, the oil level in the float chamber will gradually rise. As the float is prevented from rising by the valve member bearing against the valve seat, the oil will flow through opening 45 formed in the float. As the float gradually fills it begins sinking, which allows the valve member 11 to open wide, which permits a rush of oil past the valve seat for flushing the same. As the float continues to sink the lever 16 will bear against the cross-piece 41, thereby urging the safety shut-off lever 35 downwardly on the valve member 11. This forces the valve member 11 against its seat and provides safety shut-off. The parts will now remain in this position until the float is emptied. In the embodiment of the invention illustrated, this is done by removing the cover 31 and the pivot pin 18. This permits the float 15 to be removed and emptied. When the float is replaced the parts are again ready for normal operation.

It should be noted that when the valve is in its safety shut-off position considerably more closing force is applied than occurs during normal operation. In valves of the character described it is considered essential to maintain the oil level plus or minus 1/64", making a total permissible differential of 1/32". The total force for operating the float for maintaining the level within these limits is equal to the weight of a volume of oil 1/32" thick and having an area equal to that of the float. Inasmuch as fuel oil is of low specific gravity, the available force for closing the valve during normal operation is quite small, even though the leverage provided by lever 16 provides approximately a 4 to 1 mechanical advantage.

When the valve is in its safety shut-off position it will be seen that the lever 35 provides for a considerably increased mechanical advantage between the float and valve member. Thus the distance between the cross-piece 41 and the pivot pin 36 of the lever 35 is approximately three times the distance between the abutment 38 and the pivot pin 36. This provides a mechanical advantage produced by the lever 35 of approximately 3 to 1. This leverage is added to the leverage provided by the float lever. It will be noted that the distance between the float lever pivot 18 and the center of buoyancy of the float 15 is approximately three times the distance between the pivot 17 and cross-piece 41. Thus the float lever provides a leverage of approximately 3 to 1 and the safety lever provides an additional leverage of 3 to 1, making a total 9 to 1 mechanical advantage now present between the float and valve member. In addition it should be noted that in safety shut-off position, the entire weight of the float is acting to seat the valve. This weight is equal to the entire quantity of oil displayed by the float when the valve is open. This is obviously many times the weight of the 1/32" layer of oil which is available for operating the float during normal operation.

Summarizing, the arrangement above described provides for an increased leverage between the float and valve member when the parts assume safety shut-off position. In addition, this arrangement utilizes the entire weight of the float for pressing the valve closed for safety shut-off instead of the much smaller force which is available during normal operation. As a result, the force available for pressing the valve closed for safety shut-off is many times that present during normal operation. Consequently it is insured that the valve will seat tightly for safety shut-off even though the valve leaked with the parts in their normal positions.

It will be apparent that without the presence of the dam 23, the float chamber could be drained of oil in the event that the oil supply became exhausted. This would result in the float assuming its lowermost position and closing the inlet valve through the safety cut-off lever 35. The user would therefore find it necessary to remove the cover and raise the float to an intermediate position in order to get the valve back in normal operation. This procedure is avoided by the dam 23 which traps sufficient oil in the float chamber to keep the float in an intermediate position in which the inlet valve remains open. Thus even if the oil supply is exhausted, the level in the float chamber will remain at least as high as the dam and the float will not lower to the point at which the inlet valve closes. As a result the valve returns to normal operation when the oil supply is replenished and no resetting is necessary.

Figure 3:
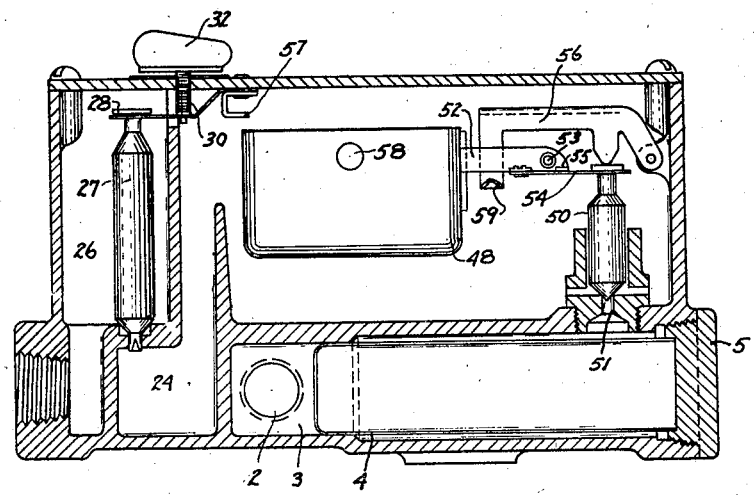
Fig. 3 is a sectional elevation of a modified form of float valve, the parts being shown in their normal positions.
Figure 4:
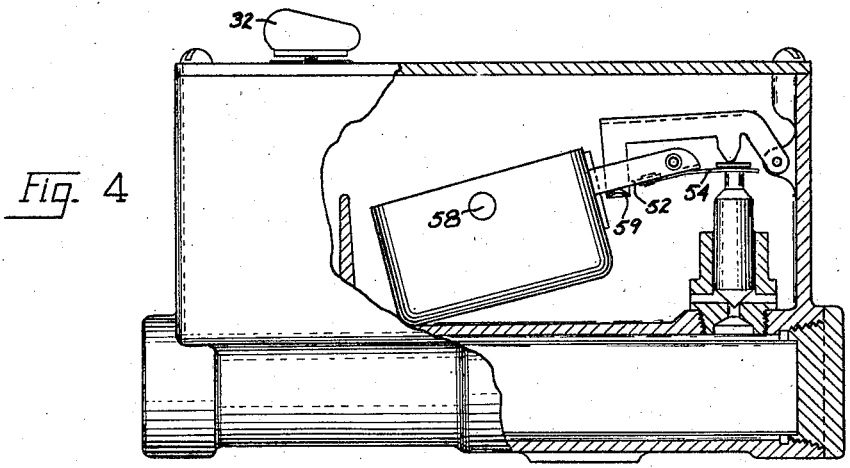
Fig. 4 shows the safety shut-down position of the device shown in Fig. 3.

*Figs. 3 and 4*

In Figs. 3 and 4 the invention is shown applied to a biased closed type of inlet valve. In this figure the valve member 50 is biased closed by its own weight to hold the required inlet pressure. The float 48 is attached to a float lever 52 which is pivoted to a pivot pin 53. This lever carries a leaf spring 54 which is biased upwardly against a stop 55 formed on lever 52. The safety cut-off lever 56 may be identical with the corresponding lever of Fig. 1.

During normal operation the parts assume the positions shown in Fig. 3. At this time the safety cut-off lever merely rides upon the valve member and does not obstruct its movement. When the oil level lowers, the float 45 lowers therewith, this causing the spring member 54 to lift the valve member from its seat and permit oil to flow into the float chamber. At this time the spring member abuts the stop 57 on the float lever, the spring tension being sufficient to lift the valve member without flexing the spring away from this stop. If the inlet valve fails to hold, the oil level will rise and the float will rise therewith until it engages a stop 57 carried by the cover plate. Further rise in oil level will result in the oil flowing through the opening 58 in the float which causes the float to sink. Initial sinking movement of the float will raise the inlet valve from its seat for permitting flushing of the valve member and seat. Continued sinking movement will result in engagement of the float arm 52 with the cross-piece 59 of the safety shut-off lever, this urging the safety shut-off lever down upon the valve member for forcing it closed. At this time the spring 54 yields, as shown in Fig. 4 for permitting the valve member to move downwardly. This spring therefore provides a yieldable or strain release connection between the float and valve member. In this embodiment of the invention the force required in flexing the spring 54 will detract somewhat from the total force applied to the valve for safety shut-off. However, due to the provision for increase in leverage and to the weight of the float, this arrangement nevertheless provides a much greater closing force for the valve on safety shut-off than is available during normal operation.

Figure 5:
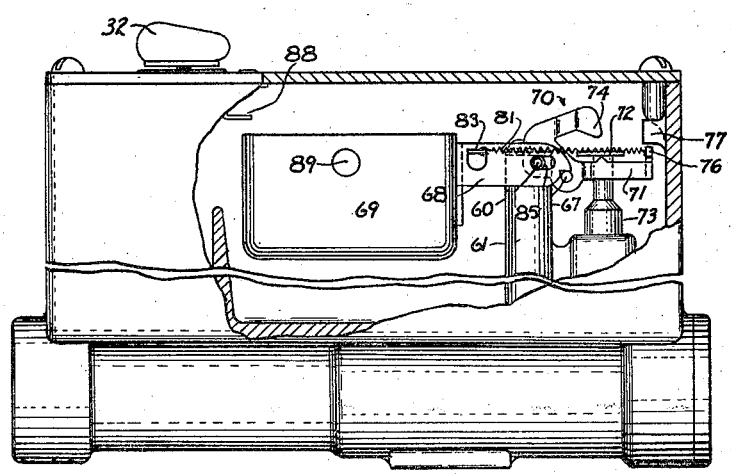
Fig. 5 is an elevation partly in section of another modification.
Figure 6:
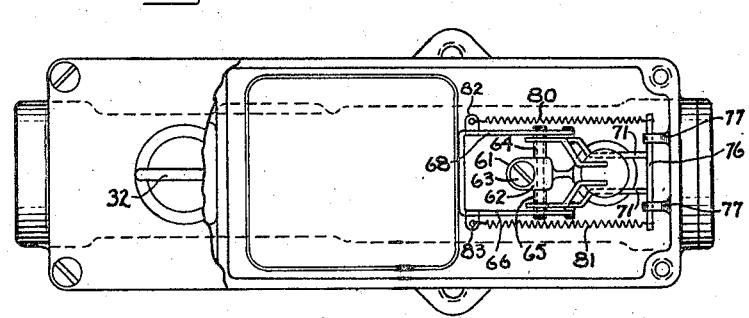
Fig. 6 is a top view of the float valve shown in Fig. 5

*Figs. 5 and 6*

Figs. 5 and 6 show still another embodiment of the invention. In these figures the pivot pin 60 for the float arm is carried by a pedestal 61 which preferably is formed integrally with the valve casting. This pivot pin is clamped in place on the top of pedestal 61 by means of a clamping member 62 which is secured to the pedestal by screw 63. Located on the pivot pin on each side of the pedestal are sleeves 64 and 65 which are freely rotatable on pin 60. The sleeves 64 and 65 fit into elongated slots 67 formed in the legs of a U-shaped float lever 68 which carries float 69. Also carried by the sleeves 64 and 65 is a lever or toggle member 70. This member consists of a lower portion 71 which is adapted to engage the underside of plate 72 on the valve member 73. The lever 70 also includes an upper or safety cut-off portion 74 which is adapted to engage the top of plate 72. The lever 70 as shown in Fig. 6 is preferably generally U-shaped, one leg riding on sleeve 64 and the other leg riding on sleeve 65. The two legs of the lower portion 71 are shown as attached to a cross-piece 76 which is adapted to engage lugs 77 formed integrally with the end wall of the valve casing. Springs 80 and 81 are attached to opposite ends of the cross-piece 76 and extend to lugs 82 and 83 which are struck out from the legs of the float lever. These springs, the float lever 68, and the toggle member 70 form a toggle with the sleeves 64 and 65 as a pivot. The springs 80 and 81 serve to hold the toggle member 70 in normal fixed relationship with the lever 68, a stop pin 85 on member 70 engaging a shoulder formed on the float lever at this time. Thus the toggle is normally in a slightly past center position and is held in this position by the springs 80 and 81 and the stop member 85.

In this embodiment of the invention the valve member 73 is formed with sufficient weight to hold against the necessary inlet pressure. Under normal control a lowering of the liquid level will cause the float to lower, this causing members 68 and 70 to rock as a unit about the pivot pin 60, thereby raising the valve from its seat. When the liquid level rises, the float rises, thereby permitting the valve to close.

In the event of leakage of the inlet valve, the liquid level will rise, causing float 69 to engage stop 88 and permitting filling of the float through opening 88, thus causing the float to sink. Initial sinking movement of the float will raise the inlet valve from its seat, thereby providing a flushing action. Further sinking movement of the float will cause the cross-piece 76 on the toggle member 70 to strike the stop members 77 thereby preventing further counter-clockwise rotation of this member. The float will continue sinking and eventually the springs 80 and 81 will be carried over-center past the pivot pin 60. The springs will now snap the toggle member 70 in a clockwise direction, causing it to strike the valve member and force it closed.

In order to reset the mechanism the cover is first removed. The float 69 is then raised and simultaneously urged to the left. Inasmuch as the opening in the float lever 68 for the pivot pin is elongated, this urging of the float to the left permits movement of the float in this direction. This causes the shoulder on the float lever 68 to clear the stop pin 85 and thus the float may be rotated to a vertical position which causes the oil to flow out of the float and back into the float chamber. After the float is emptied in this manner it is pushed back into place. Due to the action of the toggle springs 80 and 81, the parts will snap into the positions shown in Fig. 5.

From the foregoing it will be apparent that the present invention provides a simple and positive constant level control mechanism having provision for a safety shut-off action in the event of leakage. While only three embodiments of the invention have been illustrated, other modifications which are within the scope of the invention will be obvious to those skilled in the art. It is therefore desired to be limited only by the scope of the appended claims.

What is claimed is:

1. In a safety constant level control mechanism, a casing providing a float chamber and a liquid inlet port therefor, a valve seat associated with said port, a valve member cooperating with said valve seat, an open float in said chamber, pivoted lever means actuated by the float and arranged to position the valve member gradually in accordance with the position of the float for maintaining a substantially constant liquid level, said lever means providing a predetermined leverage between the float and valve member whereby a predetermined force is available for holding the valve member against its seat when the liquid is at the desired level, means for causing said open float to fill with liquid and sink when the liquid level rises a predetermined amount above said desired level, means acting through said lever means upon lowering of the float to a predetermined point for applying a greater closing force to the valve member than said predetermined force, and an outlet from the float chamber, said outlet being arranged to trap sufficient liquid in the float chamber to maintain the float above said predetermined point so long as the float is of normal buoyancy.

2. In a safety constant level control mechanism, a casing providing a float chamber and a liquid inlet port therefor, a valve seat associated with said port, a valve member cooperating with said valve seat, an open float in said chamber, pivoted lever means actuated by the float and arranged to position the valve member gradually in accordance with the position of the float for maintaining a substantially constant liquid level, said lever means providing a predetermined leverage between the float and valve member whereby a predetermined force is available for holding the valve member against its seat when the liquid is at the desired level, means for causing said open float to fill with liquid and sink when the liquid level rises a predetermined amount above said desired level, a safety shut-off lever capable of applying closing force to the valve member, means engaged by said lever means when the float lowers to a predetermined point for applying the weight of the float to said safety cut-off lever and forcing the valve member against said seat, said last mentioned means being constructed and arranged to provide a greater leverage between the float and valve member than said predetermined leverage whereby the valve member is held against its seat with greater closing force when the float is sunk than during normal operation, and an outlet from the float chamber, said outlet being arranged to trap sufficient liquid in the float chamber to maintain the float above said predetermined point so long as the float is of normal buoyancy.

3. In a safety constant level control mechanism, a casing providing a float chamber and a liquid inlet port therefor, a valve seat associated with said port, a valve member cooperating with said valve seat, an open float in said chamber adapted to fill and sink when the liquid in the chamber rises above a predetermined level, first and second pivots, lever means cooperating with said pivots in positioning the valve member in accordance with the position of the float, said lever means acting through one of said pivots for closing the valve upon rising of the float for maintaining a constant level and acting through the other of said pivots for closing the valve upon sinking of the float to a predetermined point for providing safety shut-off, said pivots being arranged relatively to the lever means in a manner providing a greater leverage between the float and valve member when the float is sunk than during normal operation, whereby a greater closing force is applied to the valve member when in safety shut-off than during normal operation, and an outlet from the float chamber, said outlet being arranged to trap sufficient liquid in the float chamber to maintain the float above said predetermined point so long as the float is of normal buoyancy.

4. In a safety constant level control mechanism, a casing providing a float chamber and a liquid inlet port therefor, a valve seat associated with said port, a valve member cooperating with said valve seat, an open float in said chamber adapted to fill and sink when the liquid in the chamber rises above a predetermined level, first and second pivots disposed on opposite sides of said valve member, a first lever carried by one of said pivots, said first lever carrying said float and serving to cause closing movement of the valve member upon rise in liquid level, a second lever carried by the other of said pivots, said second lever being engageable by said first lever and adapted to cause closing movement of the valve member upon sinking of the float.

5. In a safety constant level control mechanism, a casing providing a float chamber and a liquid inlet port therefor, a valve seat associated with said port, a valve member cooperating with said seat and biased to open position, an open float in said chamber adapted to fill and sink when the liquid in said chamber rises above a predetermined level, first and second pivots, lever means cooperating with said pivots in positioning the valve member in accordance with the position of the float, said lever means acting through one of said pivots for gradually forcing the valve member toward its seat upon rising movement of the float for maintaining a constant liquid level and acting through the other of said pivots to apply the weight of the float to the valve member for forcing the valve member against its seat when the float sinks to a predetermined point, this providing safety shut-off, and an outlet from the float chamber, said outlet being arranged to trap sufficient liquid in the float chamber to maintain the float above said predetermined point so long as the float is of normal buoyancy.

6. In a safety constant level control mechanism, a casing providing a float chamber and a liquid inlet port therefor, a valve seat associated with said port, a valve member cooperating with said seat and biased to open position, an open float in said chamber adapted to fill and sink when the liquid in said chamber rises above a predetermined level, first and second pivots, lever means cooperating with said pivots in positioning the valve member in accordance with the position of the float, said lever means acting through one of said pivots for gradually forcing the valve member toward its seat upon rising movement of the float for maintaining a constant liquid level and acting through the other of said pivots to apply the weight of the float to the valve member for forcing the valve member against its seat when the float sinks to a predetermined point, this providing safety shut-off, said pivots being arranged relatively to the lever means in a manner providing a greater leverage between the float and valve member when the float is sunk than during normal operation whereby a greater closing force is applied to the valve member when in safety shut-off than during normal operation, and an outlet from the float chamber, said outlet being arranged to trap sufficient liquid in the float chamber to maintain the float above said predetermined point so long as the float is of normal buoyancy.

7. In a safety constant level mechanism, a casing providing a float chamber and a liquid inlet port therefor, a valve seat associated with said port, a valve member cooperating with said seat and biased to closed position with a force normally sufficient to prevent entry of liquid into the float chamber, an open float in said chamber adapted to fill and sink when the liquid in said chamber rises above a predetermined level, first and second pivots, lever means cooperating with said pivots in positioning said valve member in accordance with the position of the float, said lever means acting through one of said pivots for gradually forcing the valve member from its seat as the liquid level lowers from a predetermined desired level for thereby maintaining such level substantially constant, said lever means acting through the other of said pivots to permit movement of the valve member to closed position when the float sinks beyond a predetermined point.

8. In a safety constant level mechanism, a casing providing a float chamber and a liquid inlet port therefor, a valve seat associated with said port, a valve member cooperating with said seat and biased to closed position with a force normally sufficient to prevent entry of liquid into the float chamber, an open float in said chamber adapted to fill and sink when the liquid in said chamber rises above a predetermined level, first and second pivots, lever means cooperating with said pivots in positioning said valve member in accordance with the position of the float, a yieldable member interposed between the float and valve member, said lever means acting through one of said pivots and said yieldable member for gradually forcing the valve member from its seat as the liquid level lowers from a predetermined desired level for thereby maintaining such level substantially constant, said lever means acting through the other of said pivots to cause flexing of said yieldable member to permit movement of the valve member to closed position when the float sinks beyond a predetermined point.

9. In a safety constant level mechanism, a casing providing a float chamber and a liquid inlet port therefor, a valve seat associated with said port, a valve member cooperating with said seat and biased to closed position with a force normally sufficient to prevent entry of liquid into the float chamber, an open float in said chamber adapted to fill and sink when the liquid in said chamber rises above a predetermined level, first and second pivots, lever means cooperating with said pivots in positioning said valve member in accordance with the position of the float, a yieldable member interposed between the float and valve member, said lever means acting through one of said pivots and said yieldable member for gradually forcing the valve member from its seat as the liquid level lowers from a predetermined desired level for thereby maintaining such level substantially constant, said lever means acting through the other of said pivots to cause flexing of said yieldable member and to apply the weight of the float to the valve member for holding the same closed when the float sinks beyond a predetermined point.

10. In a safety constant level mechanism, a casing providing a float chamber and a liquid inlet port therefor, a valve seat associated with said port, a valve member cooperating with said seat and biased to closed position with a force normally sufficient to prevent entry of liquid into the float chamber, an open float in said chamber adapted to fill and sink when the liquid in said chamber rises above a predetermined level, first and second pivots located on opposite sides of the valve member, a yieldable connection, a first lever carried by one of said pivots, said first lever carrying the float and acting through said yieldable connection to force the valve gradually from its seat as the liquid level lowers from a predetermined desired level for thereby maintaining such level substantially constant, a second lever carried by the other of said pivots, said second lever being engaged by the first lever and serving to apply the weight of the float to the valve member for holding the same closed when the float sinks to a predetermined point, said yieldable connection permitting sinking movement of the float to said predetermined point.

11. In a safety constant level control mechanism, a casing providing a float chamber and a liquid inlet port therefor, a valve seat associated with said valve port, a valve member cooperating with said valve seat, a pivot, a first toggle member carried by said pivot, an open float carried by said first toggle member, a second toggle member carried by said pivot, said second toggle member being arranged to actuate the valve member, stop means between said toggle members for limiting relative movement therebetween, a spring cooperating with said stop means for holding said toggle members in a slightly past center position to form a lever of said two toggle members, said lever serving normally to cause graduated closing movement of the valve member upon rising of the float for maintaining a substantially constant level, means for causing said float to fill with liquid and sink when the liquid rises a predetermined amount above said constant level, and means for causing over-center movement of said toggle members upon sinking of the float to cause said spring to urge the second toggle member against the valve member for maintaining the same closed.

12. In a safety constant level control mechanism, a casing providing a float chamber and a liquid inlet port therefor, a valve seat associated with said port, a valve member cooperating with said valve seat, an open float in said chamber, pivoted lever means actuated by the float and arranged to position the valve member gradually in accordance with the position of the float for maintaining a substantially constant liquid level, means for causing said open float to fill with liquid and sink when the liquid level rises a predetermined amount above said desired level, means acting through said lever means upon sinking of the float for applying a closing force to the valve member, and means for permitting said float to be emptied by rotation of the lever means about said pivot without removal of the pivot.

JOHN L. HARRIS.